United States Patent Office 3,121,694
Patented Feb. 18, 1964

3,121,694
REGENERATION OF SPENT EXHAUST GAS CONVERSION CATALYSTS WITH SULFUR TRIOXIDE
Edward Michalko, Chicago, Ill., assignor to Universal Oil Products Company, Des Plaines, Ill., a corporation of Delaware
No Drawing. Filed Feb. 13, 1961, Ser. No. 88,611
5 Claims. (Cl. 252—415)

The present invention relates to the regeneration or reactivation of catalytic contact masses which have become contaminated with lead as a consequence of exposure to contact with lead-containing waste gases incident to the catalytic conversion of such waste gases; and, in particular, the present invention concerns the regeneration of catalysts employed in the conversion of the exhaust gases emanating from an internal combustion engine using leaded fuel.

It is now recognized that the elimination of certain components present in automotive exhaust gases is highly desirable and of prime importance in protecting the public health and welfare. The unavoidably incomplete combustion of hydrocarbon fuels by the gasoline or diesel engine results in the generation of substantial quantities of unburned hydrocarbons and various other undesirable materials which are released to the atmosphere through the exhaust line. With the ever-increasing concentration of automobiles, particularly in urban areas, the discharge of such waste gases into the atmosphere may reach significantly deleterious proportions. These combustion products are believed to react with atmospheric oxygen, under the influence of sunlight, to produce what is now commonly referred to as smog. Such combustion products include, by way of example, saturated and unsaturated hydrocarbons, partially oxidized hydrocarbons such as alcohols, ketones, aldehydes and acids, etc., carbon monoxide, and various oxides of nitrogen and sulfur. The destructive oxidation of these exhaust gas constituents by catalytic means is considered to be by far the preferred technique. The desired objective is to achieve substantially complete conversion of all of the unburned hydrocarbons, particularly the high molecular weight unsaturated hydrocarbons, and carbon monoxide, as well as the oxygenated hydrocarbons herein above set forth, into carbon dioxide and water prior to discharging the exhaust gases into the atmosphere. Gasoline powered internal combustion engines are a major but not the only source of atmospheric pollution; others include diesel engines, propane or butane engines, natural gas engines, fired heaters, flare stacks, and the like.

Catalytic means for improving waste gases for discharge into the atmosphere, and particularly for effecting the conversion of the hydrocarbonaceous combustion products contained within the exhaust gases emanating from an internal combustion engine, requires the use of a catalyst possessing an exceptionally high degree of activity, and particularly a high stability or capability of performing its intended function for an extended period of time. A wide variety of factors affect the stability of active catalytic composites, which factors are generally peculiar to the environment in which the catalyst is employed. In regard to catalysts for the conversion of hydrocarbonaceous combustion products emanating from an internal combustion engine, the actual operation of the engine must be considered. For example, such engine is commonly operated over a wide range of speed and load conditions and, therefore, the combustion efficiency thereof correspondingly varies; the space velocity and temperature of the exhaust gases, as well as the concentration of combustible material therein, likewise vary over wide limits. The catalyst should be capable of withstanding high temperatures of the order of 1600° F. to as high as 2000° F. without rapid thermal deactivation, and preferably should possess maximum activity at substantially lower temperatures. The catalyst should have a relatively low threshold-activation temperature in order that the conversion reactions be self-initiating within a minimum time following startup from relatively cold conditions. In general, it is desirable that the catalyst be satisfactorily active at temperatures within the range of about 200° F. to about 2000° F.

The catalyst is usually employed in the form of a confined particle-form bed disposed in a suitable container or catalytic convertor which is installed in the engine exhaust line. The catalytic convertor may be of the through-flow, cross-flow, or radial-flow design and, in the case of vehicular applications, may supplant or be combined with the usual acoustic muffler. In the majority of systems, secondary or combustion air is injected upstream of the catalytic conversion zone, usually by means of an aspirator or by external compressor means.

Although a great many potentially good, high activity catalysts have been developed which perform well even under the aforesaid adverse conditions, such catalysts are nevertheless deleteriously affected by lead and lead compounds which are present as vapors or as entrained solids in the exhaust gases resulting from the combustion of a leaded fuel. The majority of motor fuels, including some fuels for marine engines, contain tetraethyl lead or equivalent lead compounds as an additive for increasing the antiknock efficiency of the engine in which the fuel is consumed. A typical commercial tetraethyl lead additive contains, in addition, approximately 2 gram-atoms of chlorine and 1 gram-atom of bromine, usually as ethylene dihalide, per gram-atom of lead, which is thus 1.5 times the stoichiometric quantity of halogen required to form the lead dihalide; in conventional terminology, the tetraethyl lead additive is said to contain 1.5 "theories" of halogen. The halogen serves as a scavenging agent to prevent buildup of lead deposits on spark plugs and engine cylinder walls by preferentially converting the lead tetraethyl, under the elevated cylinder temperatures prevailing during combustion, to highly volatile lead halides, for example, to lead chloride and lead bromide or to the oxyhalides of lead; substantial quantities of lead are, under some conditions, converted via the Deacon reaction to less volatile lead oxides. The major proportion of these lead compounds are discharged, as vapors or fines, into the exhaust line along with the exhaust gases. When the resulting lead-contaminated exhaust gases pass into contact with the exhaust gas conversion catalyst, the stability of the catalyst is substantially impaired, which phenomenon is demonstrated by the fact that the catalyst deactivation rate is very much greater than when unleaded fuel is employed.

On its face, this result would appear quite anomalous since a substantial portion of the lead enters the conversion zone as a halide, and the normal catalyst bed temperature is in the range of 500° F. to 1600° F. whereby such halide is readily volatilized, whence one would expect the lead halide to pass completely through the bed with as much facility as it escaped deposition upon the engine cylinder walls and exhaust manifold structure. Such, however, is not the case. Although various theories have been proposed to explain the deactivation of catalysts by lead, it appears that the principal mechanism by which catalyst poisoning or deactivation occurs is one of chemical reaction between the volatile lead compounds and the catalyst base whereby to yield a stable, relatively non-volatile lead compound-catalyst base complex which plugs the pores of the catalyst and/or forms a monomolecular film of complex over the entire micro-structure of the catalyst; evidence favors the latter theory because, in most instances, physical measurements of spent lead-contaminated catalyst reveal no appreciable reduction in surface area or pore volume as against those of the fresh catalyst. By catalyst base is meant a refractory inorganic oxide carrier or support, preferably of medium to high surface area, with which one or more catalytically active metals are composited. Typical bases include, for example, alumina, magnesia, titania, silica, alumina-silica, alumina-zirconia, alumina-silica-zirconia, and the like. The deactivation of the catalyst is believed to proceed via the following reactions which are exemplary but not exhaustive of the several interactions of lead compounds with catalyst bases:

(1) $MeOH + PbX_2 \rightleftharpoons MeOPbX + HX$ (2) $MeOH + MeOPbX \rightleftharpoons MeOPbOMe + HX$ (3) $MeOPbX + H_2O \rightleftharpoons MeOPbOH + HX$ (4) $Me_2O + PbX_2 + H_2O \rightleftharpoons (MeO)_2Pb + 2HX$ where Me represents an equivalent of a metallic component of the catalyst base, e.g. Al, Mg, Zr, Ti, etc. and X is a halogen, for example, chlorine, bromine or iodine. Water, in the vapor or superheated vapor state, enters into reactions (3) and (4), supra, which water is inevitably present in hydrocarbon combustion products. When the catalyst accumulates an average lead content within the range of 1% to 50% by weight, and, more commonly, 5% to 30% by weight, which may occur after anywhere from 1000 to 20,000 road miles of operation, depending upon the presence or absence of catalyst guard media, average space velocity, concentration of lead in the fuel, physical and/or chemical properties of the catalyst, and various other factors, the hydrocarbon and carbon monoxide conversion activities of the catalyst have usually fallen to such a low value as to preclude continued use, and such lead-contaminated catalyst must therefore be replaced with fresh catalyst or regenerated.

Experimental data have shown that when a catalyst is exposed to contact with a preponderance of plumbiferous gases, the lead content of the catalyst eventually stabilizes at an equilibrium level, usually in the range of from about 5% to about 30% by weight of lead, in a manner somewhat analogous to the deposition of coke upon cracking catalyst in a fluid catalytic cracking unit with resultant attainment of "equilibrium" catalyst.

The instant invention has for its principal objective a method of regenerating a lead-contaminated, platinum-containing catalyst, and is founded upon the discovery that the conversion activity of such spent catalyst may be substantially restored by contacting the catalyst with anhydrous gaseous sulfur trioxide.

Prior art methods of regenerating a lead-contaminated catalyst have been concerned with more or less complete removal of the lead by treating the catalyst with medium to strong acids such as nitric acid, hydrochloric acid, aqua regia, acetic acid, and the like. However, these reagents will also attack, by way of dissolution or oxidation or both, many of the components most beneficially employed in oxidation catalysts such as alumina, magnesia, titania, zirconia, copper, silver, gold, the iron group metals and oxides thereof, and to a lesser extent the platinum group metals; while the removal of lead may be substantially complete, there often results the concurrent loss of valuable catalytic constituents and/or an adverse chemical or physical change in the treated catalyst.

The sulfur trioxide treatment of the instant invention, on the other hand, is extremely advantageous in that it causes no appreciable loss of catalytic constituents; further, while the sulfur trioxide effects little or no removal of the lead, surprisingly the oxidation activity of the regenerated catalyst is nevertheless virtually completely restored.

The precise effect of sulfur trioxide upon a lead compound-catalyst base complex is not known; it is established, however, that improved catalytic activity and any substantial degree of lead removal are not necessarily concomitant. For this reason it is believed that the sulfur trioxide converts the several lead compound-catalyst base complexes to a form or forms of lead which exert a substantially lessened deactivating effect upon the catalyst. The instant method is, of course, applicable to regeneration in situ and to external regeneration.

In one embodiment, the present invention is directed to a method of regenerating a lead-contaminated catalyst comprising in its lead-free state a platinum group metal and a refractory inorganic oxide carrier, which comprises contacting said catalyst with anhydrous gaseous sulfur trioxide.

A more specific embodiment of the instant invention provides a method of regenerating a lead-contaminated catalyst comprising in its lead-free state a platinum group metal and a refractory inorganic oxide carrier, said catalyst containing from about 1% to about 50% by weight of lead, which comprises contacting said catalyst with anhydrous gaseous sulfur trioxide at a temperature above about 60° F.

The term "lead-contaminated" refers to metallic lead, lead compounds, particularly lead salts such as the sulfates and halides thereof, lead oxides, lead oxyhalides, mixtures of two or more such lead compounds, lead- or lead salt-catalyst complexes etc., since the actual form or forms in which the lead may exist in the exhaust gases or in combination with the catalyst are not definitely known and, in any event, are of no consequence to the operability of the present method.

Briefly, the present invention involves subjecting the spent, lead-contaminated, platinum-containing catalyst to contact with an atmosphere of anhydrous gaseous sulfur trioxide for a sufficient length of time to substantially restore the hydrocarbon oxidation activity of the catalyst; a simple test has been devised which enables one to determine when such activity has been restored, the details of which will be discussed hereinbelow. When the oxidation catalyst has accumulated during its use sufficient lead as to become substantially deactivated, such amount being from about 1% to about 50% by weight of lead based on the leaded catalyst, and, more commonly, from about 5% to about 30% by weight, the catalyst may either be removed from the converter and regenerated in special facilities therefor, or regenerated in situ. The contacting may be done batchwise, that is, in a rotating autoclave or other closed vessel containing a fixed excess volume of sulfur trioxide, or stream-wise, by passing a stream of sulfur trioxide through a bed of catalyst to be regenerated. The sulfur trioxide must be anhydrous to prevent the formation of sulfuric acid which would dissolve and destroy the refractory oxide base of the catalyst. The regenerating gas may consist entirely of sulfur trioxide or it may be a mixture of sulfur trioxide with air or oxygen to provide an oxidizing atmosphere and to inhibit the formation of sulfur dioxide, or the regenerating gas may comprise a mixture of sulfur trioxide with one or more inert diluents, i.e., gaseous elements or compounds which are substantially unreactive toward the lead and catalyst. Suitable inert diluents include, but are not limited to, nitrogen, carbon dioxide, helium, neon, argon, krypton and xenon. Where an inert diluent is employed, the inert diluent is preferably present in major proportion, the sulfur trioxide comprising from about 1 mol percent to about 50 mol percent of the mixture. The contacting temperature may range from ambient, that is, about 60° F., up to as high a temperature as desired without, however, fusing of the catalyst or reaching such a high temperature as to cause fusing of the catalyst or substantially complete decomposition of the sulfur trioxide into sulfur dioxide. The regeneration proceeds more rapidly with increasing temperature, and the preferred temperature range is from about 60° F. to about 1400° F.

The time required to effect the regeneration depends, of course, upon a number of variables such as the initial concentration of lead in the catalyst, the size and disposition of the catalyst particles, the temperature of the regeneration, and the space velocity of the sulfur trioxide gas. Where stream-wise contacting is employed, the preferred space velocity is within the range of 5 to 5000 volumes of sulfur trioxide per volume of catalyst per hour, and more desirably within the range of 50 to 1000 volumes of sulfur trioxide per volume of catalyst per hour, which volume measurements are taken at atmospheric pressure.

The pressure of regeneration is not critical and may range from subatmospheric to 1000 p.s.i. or more; however, good results are obtained, as well as economy of operation, when the regeneration is conducted at about atmospheric pressure.

The application of the method of this invention is restricted to those catalysts which comprise a platinum group metal, i.e., platinum, iridium, osmium, palladium, rhodium, ruthenium as the principal catalytically active metallic component thereof, for the reason that catalysts containing metals to the exclusion of platinum group metals, for example, manganese, copper, cobalt and silver, do not appear to be amenable to regeneration with sulfur trioxide; this does not, however, preclude the regenerability of catalysts containing other catalytically active metallic components in addition to one or more of the platinum group metals. In general, the class of catalysts which may be successfully regenerated by the instant method comprises a platinum group metal composited with a refractory inorganic oxide carrier, with or without the addition of one or more other oxidizing promoters such as vanadium, chromium, manganese, molybdenum, tungsten, iron, cobalt, nickel, copper, silver, gold, etc.

The refractory inorganic oxide carrier may be any of those commonly employed and well-known to the catalysis art for use as a catalyst base such as alumina, silica, magnesia, zirconia, and titania, as well as combinations of two or more such as alumina-silica, alumina-magnesia, alumina-zirconia, alumina-titania, silica-magnesia, silica-zirconia, silica-titania, magnesia-zirconia, magnesia-titania, zirconia-titania, alumina-silica-magnesia, alumina-silica-zirconia, alumina-silica-titania, alumina-magnesia-zirconia, alumina-magnesia-titania, alumina-zirconia-titania, silica-magnesia-zirconia, silica-magnesia-titania, silica-zirconia-titania, magnesia-zirconia-titania, etc. Improved results with respect to lead stability in the oxidation of plumbiferous exhaust gases appear to obtain when the catalyst base comprises a major portion of alumina, particularly low-density alumina, that is, an active form of alumina having an apparent bulk density of less than about 0.40 gram per cubic centimeter of base. The addition or incorporation of any of the other above-enumerated refractory inorganic oxides with the alumina is generally dependent upon the desire to add thereto certain physical and/or chemical characteristics. The added oxide or oxides may be present in the carrier material in an amount within the range of from about 0.1% to about 30% by weight thereof. Intermediate quantities are preferred, and will normally be within the range of about 1% to about 10% by weight. The additional oxide or oxides may be effectively incorporated with the alumina by adding a water-soluble salt of the component into the solution from which the alumina is precipitated. The catalyst may take the form of any desired shape such as spheres, pills, extrudates, powder, granules, cakes, etc.; however, the preferred form of support is the sphere, and particularly good spheres of the required low density may be continuously manufactured by the well-known oil drop method following the procedure described in U.S. Patent No. 2,620,314, issued to James Hoekstra. The presence of minor amounts of silica, in the range of from about 0.5% to about 25% by weight of carrier, promotes the cracking of heavier hydrocarbon exhaust gas constituents, thereby enabling the oxidation thereof to proceed more readily, while the addition of minor quantities of zirconia, in the range of from about 0.1% to about 10% by weight of carrier, appears to improve the physical strength of the catalyst and to render it more attrition resistant. In addition, the base and/or active metallic component may contain a minor amount of combined halogen, particularly combined fluorine and/or chlorine, which further increases lead stability as well as promotes cracking of the heavier hydrocarbon exhaust gas constituents. In addition to the oil drop method, the catalyst base may be manufactured by any other suitable method including separate, successive or co-precipitation methods of manufacture. It may comprise naturally occurring substances such as clays or earths, which may or may not be activated prior to use by one or more treatments including drying, calcining, steaming, or particular treatments with various inorganic and organic reagents.

Various methods are available for compositing the platinum group metal with the carrier material. The platinum group metal and other catalytically active metallic component, if such is employed, may be combined with the carrier material by separate, simultaneous, or successive precipitation methods, or by impregnating the carrier with a soluble salt of the catalytically active metal. For example, when platinum is employed, it may be added to the carrier material by commingling the latter with an aqueous solution of chloroplatinic acid. Other water-soluble compounds of platinum, or of other noble metal components, may be utilized within the impregnating solution. Where the catalyst is to contain other metallic compounds in addition to platinum, the catalyst may be prepared by commingling soluble compounds of these components, particularly the nitrates, chlorides or carbonates, and soaking the particles of the inorganic refractory oxide therein, followed by heating to form the corresponding oxides of the metallic components. When impregnating techniques are employed, one or more impregnating solutions may be utilized containing one or more of the catalytically active metallic components; for example, when the catalyst is to contain both platinum and cobalt, the platinum may be impregnated within the carrier material, subsequently calcined, followed by a second impregnation with the cobalt component. Although the precise means by which a metallic component is combined with a refractory carrier material is not known, it is believed that it exists in some physical association or chemical complex therewith. Thus, platinum may be present as a free metal, or as a chemical compound or in physical association with the carrier material, or with other catalytically active metallic components, or in some combination with both. Many methods of preparing such catalytic composites exist and are well known in the prior art; these need not be described in detail herein since no claim is being made for any particular method of manufacturing the oxidation catalyst.

The following example is given for the purpose of further illustrating the method of the present invention, and to indicate the unusual benefits afforded through the utilization thereof. It is not intended that the present invention be limited to the reagents, concentrations, and/or conditions employed within the example, nor to the method of preparing the catalyst utilized therein.

EXAMPLE I

An oxidation catalyst consisting of platinum on a fluorided alumina-zirconia carrier was prepared as follows: an alumina-zirconia base containing 1.5% zirconia by weight and having the form of 1/16" spheres was impregnated with an aqueous ammonium fluoride solution; the impregnated spheres were evaporated to dryness at 300° F. and calcined for 2 hours at 1000° F. in a muffle furnace.

The fluorided base was then impregnated with an aqueous chloroplatinic acid solution and the impregnated spheres were then dried at 300° F. followed by reduction in hydrogen at 1000° F. for 2 hours. The finished catalyst contained 0.1% Pt and 0.5% F by weight on an alumina-zirconia base containing 1.5% of zirconia by weight. About 5 pounds of this catalyst was loaded into a catalytic converter installed in the exhaust line of an automotive type internal combustion engine mounted on a dynamometer test stand. The engine was run under load for a period of 40 hours at speeds varying from 1300 to 2500 r.p.m., using as fuel a premium grade gasoline containing 3 milliliters of tetraethyl lead per gallon. A slipstream of about 25% of the total volume of the plumbiferous exhaust gases issuing therefrom was admixed with secondary air and the mixture was passed through the catalyst bed. At the end of the 40 hour run, the hydrocarbon and carbon monoxide conversion activities of the catalyst had fallen to a low level, and the catalyst was removed from the converter. Spectrographic analysis of the spent catalyst showed that it now contained 20% lead by weight.

A 20 cubic centimeter portion of this spent catalyst was then regenerated according to the following procedure: the 20 cc. portion of spent catalyst was placed in a 1" I.D. electrically heated Vycor tube. Upstream from the spent catalyst bed, in the same tube, there was placed a bed of fresh platinum-alumina catalyst. Both catalyst beds were maintained at a temperature of about 930° F. A mixture of air (600 cc. per minute) and sulfur dioxide (100 cc. per minute) was passed into the upstream end of the tube and through the upstream bed of platinum catalyst, whereby the sulfur dioxide was converted to sulfur trioxide. The sulfur trioxide and excess air then flowed through the spent catalyst bed. The treatment was continued for about 30 minutes; completion of the regeneration was marked by the sudden appearance in the exit gases leaving the tube of white fumes resulting from the interaction of sulfur trioxide and water formed by incipient dehydration of the alumina catalyst base.

The activity of the untreated and regenerated catalysts, as well as that of fresh catalyst, was tested by measuring the ignition temperature and temperature rise obtained by passage of air containing benzene vapor, under standardized conditions, into and through an apparatus in which a bed of catalyst was gradually heated until ignition of the benzene vapor occurred, which ignition was indicated by the appearance of a temperature differential between bed inlet and bed outlet. A small temperature rise and/or a high ignition temperature indicate low hydrocarbon and carbon monoxide conversion activities. This "benzene ignition test" provides a simple and rapid qualitative evaluation of the ability of a catalyst to oxidize exhaust gas constituents. A great many different catalysts were tested, firstly, by elaborate and exhaustive procedures using both road-driven automobiles and dynamometer test stands, and, again, by the benzene ignition test; a correlation between the two methods has shown that a catalyst, when subjected to the foregoing benzene oxidation test, must have an ignition temperature of less than about 600° F. and a temperature rise above about 400° F. to perform satisfactorily as an exhaust gas oxidation catalyst. The details of the benzene ignition test are as follows: a 10 cubic centimeter volume of the catalyst to be tested is placed in a 1" I.D. electrically heated Vycor tube. Thermocouples are placed at the bed inlet, bed center, and bed outlet and are connected to a strip chart potentiometer temperature recorder. A stream of nitrogen at a flow rate of 200 cc. per minute, under substantially atmospheric pressure, is bubbled through a bath of liquid benzene maintained at a temperature of about 20° C.; the nitrogen-benzene vapor effluent is then admixed with a stream of air flowing at the rate of 5 liters per minute, under substantially atmospheric pressure, and the air-nitrogen-benzene vapor mixture is then passed through the catalyst bed. The Vycor tube is gradually but steadily raised in temperature. Before ignition takes place, the inlet and outlet temperatures, although increasing, remain equal. At the ignition point, the outlet temperature will suddenly increase at a faster rate than the inlet temperature and will commence to diverge therefrom until equilibrium conditions are reached. After equilibrium is established, the inlet and outlet temperature plots become parallel lines that are separated by a distance representing the differential temperature rise. The terms "benzene ignition temperature" and "benzene temperature rise" as used in the appended claims are defined as the observed ignition temperature and temperature differential, respectively, of any catalyst when subjected to the foregoing test procedure.

A comparison of the activities of fresh fluorided platinum-alumina-zirconia catalyst, spent catalyst and regenerated catalyst is shown in Table I:

Table I

| Catalyst | Wt. Percent Pb | Activity before Regeneration | | Activity after Regeneration | |
|---|---|---|---|---|---|
| | | Ignition Temp., °F. | Temp. Rise, °F. | Ignition Temp., °F. | Temp. Rise, °F. |
| Fresh | 0 | 425 | 560 | | |
| Spent | 20 | 575 | 275 | 450 | 575 |

It may be seen from the data of Table I that, upon treatment of the spent catalyst with sulfur trioxide, its ignition temperature has been lowered 125° F. almost to that of the fresh catalyst while the temperature rise has more than doubled, even exceeding the temperature rise of the fresh catalyst. As hereinbefore set forth, the activity of the catalyst being regenerated is considered to be sufficiently restored when its benzene ignition temperature is reduced to below about 600° F. and its benzene temperature rise is raised to above about 400° F., at which point the sulfur trioxide treatment may be discontinued.

The regeneration may readily be carried out in situ in vehicular catalytic converters simply by providing a valved inlet conduit in the exhaust pipe upstream from the converter, first charging hot dry air to the inlet conduit to dry the catalyst and associated hardware, and then passing anhydrous sulfur trioxide therethrough for a sufficient length of time, determined by catalyst volume, sulfur trioxide content and temperature, to achieve the necessary degree of regeneration.

The present invention thus provides a simple, single-step gas phase treatment which effectively regenerates platinum-containing catalysts which have become deactivated by lead. Physical removal of the lead from the catalyst is unnecessary and does not occur, hence there are no hazardous lead-containing fumes in the regenerating gas effluent to contend with. The gas phase operation eliminates the need for pumps, storage tanks, waste disposal facilities and other elaborate apparatus which are required in conventional liquid phase regeneration processes.

I claim as my invention:

1. A method of regenerating a lead-contaminated oxidation catalyst comprising in its lead-free state a platinum group metal and a refractory inorganic oxide carrier which comprises contacting said catalyst with anhydrous gaseous sulfur trioxide at a temperature of from about 60° F. to about 1400° F. for a sufficient time to substantially restore the oxidation activity of the catalyst.

2. A method of regenerating a lead-contaminated oxidation catalyst comprising in its lead-free state a platinum group metal and a refractory inorganic oxide carrier, said catalyst containing from about 1% to about 50% by weight of lead, which comprises contacting said catalyst with anhydrous gaseous sulfur trioxide at a temperature of from about 60° F. to about 1400° F. for a sufficient time to substantially restore the oxidation activity of the catalyst.

3. The method of claim 1 further characterized in that said catalyst in its lead-free state comprises from about 0.05% to about 5% by weight of platinum.

4. A method of regenerating a lead-contaminated catalyst comprising in its lead-free state platinum and alumina, said catalyst containing from about 1% to about 50% by weight of lead, which comprises contacting said catalyst with anhydrous gaseous sulfur trioxide at a temperature of from about 60° F. to about 1400° F. and continuing said contacting until the benzene ignition temperature of the catalyst is below about 600° F. and the benzene temperature rise of the catalyst is above about 400° F.

5. The method of claim 4 further characterized in that said catalyst in its lead-free state comprises from about 0.05% to about 1% by weight of platinum.

References Cited in the file of this patent

UNITED STATES PATENTS 1,678,627     Jaeger _____ July 24, 1928